(12) United States Patent
Duan et al.

(10) Patent No.: US 8,858,836 B2
(45) Date of Patent: Oct. 14, 2014

(54) BOROPHOSPHATE PHOSPHOR AND LIGHT SOURCE

(75) Inventors: Cheng-Jun Duan, Anhui (CN); Sven Roesler, Eisenach (DE)

(73) Assignee: Leuchtstoffwerk Breitungen GmbH (DE)

(*) Notice: Subject to any disclaimer, the term of this patent is extended or adjusted under 35 U.S.C. 154(b) by 0 days.

(21) Appl. No.: 13/881,522

(22) PCT Filed: Oct. 19, 2011

(86) PCT No.: PCT/EP2011/068226
§ 371 (c)(1),
(2), (4) Date: Apr. 25, 2013

(87) PCT Pub. No.: WO2012/055729
PCT Pub. Date: May 3, 2012

(65) Prior Publication Data
US 2013/0214673 A1 Aug. 22, 2013

(30) Foreign Application Priority Data

Oct. 26, 2010 (EP) .................................. 10188834

(51) Int. Cl.
*C09K 11/72* (2006.01)
*C09K 11/77* (2006.01)
*F21V 9/16* (2006.01)

(52) U.S. Cl.
CPC ......... *C09K 11/7737* (2013.01); *C09K 11/7797* (2013.01); *F21V 9/16* (2013.01); *C09K 11/7796* (2013.01); *C09K 11/774* (2013.01); *Y02B 20/181* (2013.01)
USPC ............... 252/301.6 P; 252/301.4 P; 313/483

(58) Field of Classification Search
CPC ........... C09K 11/7737; C09K 11/7793; C09K 11/774; C09K 11/7797

USPC ...................... 313/483; 252/301.6 P, 301.4 P
See application file for complete search history.

(56) References Cited

U.S. PATENT DOCUMENTS

| 4,185,222 A | 1/1980 | van den Boom et al. |
| 2005/0096420 A1* | 5/2005 | Delp et al. ................. 524/430 |

FOREIGN PATENT DOCUMENTS

| DE | 1 927 455 | 11/1965 |
| DE | 2 900 989 | 7/1979 |

(Continued)

OTHER PUBLICATIONS

Ma, Liang et al., "The Origin of 505 nm-Peaked Photoluminescence from Ba3MgSi2O8:Eu2+, Mn2+ Phosphor for White-Light-Emitting Diodes", Electrochemical and Solid-State Letters, 11 (2), pp. E1-E4 (2008). (4 pages total).

(Continued)

*Primary Examiner* — Nimeshkumar Patel
*Assistant Examiner* — Christopher Raabe
(74) *Attorney, Agent, or Firm* — Ann Wieczorek; Mayer & Williams PC

(57) ABSTRACT

This invention is related to efficient inorganic borophosphate phosphors which can applied in various technical applications such as fluorescent lamps, colored light or white light emitting diodes, and other devices where phosphors are used to convert especially near UV radiation into the visible light. Further, this invention is related to light sources comprising the efficient borophosphate phosphor. The inventive phosphor absorbs radiation in a first wavelength range of the electromagnetic spectrum and emits radiation in a second wavelength range of the electromagnetic spectrum. This phosphor is a borophosphate activated with divalent rare earth metal ions.

13 Claims, 5 Drawing Sheets

(56) References Cited

FOREIGN PATENT DOCUMENTS

| | | |
|---|---|---|
| GB | 2 012 300 | 7/1979 |
| GB | 2 013 968 | 8/1979 |
| WO | 2006/111568 | 10/2006 |
| WO | 2009/036425 | 3/2009 |

OTHER PUBLICATIONS

Lakshminarasimmhan, et al., "White-Light Generation i Sr2SiO4:Eu2+,Ce3+ under Near-UV Excitation," J. Electrochem. Soc. 152 (9), pp. H152-H156 (2005). (5 pages total).

Kim, et al., "White-light-emitting Eu2+ and Mn2+ -codoped silicate phosphors synthesized through combustion process," Solid State Communications 136, pp. 504-507 (2005). (4 pages total).

Kim, et al., "Warm-white-light emitting diode utilizing a single-phase full-color Ba3MgSi2O8:Eu2+, Mn2+ phosphor," Applied Physics Letters vol. 84, No. 15, pp. 2931-2933, Apr. 12, 2004. (3 pages total).

Liu, et al., "The First Single Polymer with Simultaneous Blue, Green and Red Emission for White Electroluminescence," Advanced Materials 17, pp. 2974-2978 (2005). (5 pages total).

Umetsu, et al., "Photoluminescence Properties of Ba3MgSi2O8:Eu2+ Blue Phosphor and Ba3MgSi2O8:Eu2+,Mn2+ Blue-Red Phosphor under Near-Ultraviolet-Light Excitation," J. Electrochem. Soc. 155 (7) pp. J193-J197 (2008). (5 pages total).

Chang, et al., "White light generation under violet-blue excitation from tunable green-to-red emitting Ca2MgSi2O7:Eu, Mn through energy transfer," Applied Physics Letters vol. 90, No. 161901, pp. 1-3 (2007). (3 pages total).

Zhang, et al., "A novel white light-emitting diode (w-LED) fabricated with Sr6BP5O20:Eu2+ phosphor," Appl. Phys. B 86, pp. 647-651 (2007). (5 pages total).

International Search Report issued in connection with corresponding International Application No. PCT/EP2011/068226, mailed Dec. 14, 2011 (4 pages).

Zhao et al. [Inorg. Chem. 48 (2009) pp. 6623-6629.

Ruediger Kniep, Gerd Shaefer, Hoger Engelhardt, Insan Boy: "K[ZnBP2O8] and A[ZnBP2O8] (A=NH4+, Rb+, Cs+): Zincoborophosphates as a New Class of Compounds with Tetrahedral Framework Structure", Angew. Chem. Int. Ed., vol. 28, No. 24, 1999, pp. 3641-3644.

* cited by examiner

BOROPHOSPHATE PHOSPHOR AND LIGHT SOURCE

BACKGROUND OF THE INVENTION

This invention is related to efficient inorganic borophosphate phosphors which can applied in various technical applications such as fluorescent lamps, colored light or white light emitting diodes, and other devices where phosphors are used to convert especially near UV radiation into the visible light. Further, this invention is related to light sources comprising the efficient borophosphate phosphor.

In the solid-state lighting industry, the wavelength conversion phosphor materials play a crucial role as they once did in fluorescent lamps. White LED lighting within a phosphor converted-LED (pc-LED) system can be realized by several approaches: The first approach is to combine the InGaN based blue-LED chip (emitting blue light between 455 nm and 465 nm with a yellow phosphor, i.e., YAG:$Ce^{3+}$ or $EA_2SiO_4$:$Eu^{2+}$ based materials. However, the white LED provided by this well known and established method has the disadvantages of poor color rendering when used for general lighting and small color gamut when used for backlighting. The second one is to combine a blue-LED chip with a green-emitting phosphor ($\lambda_{max}$~530 nm) and a red-emitting phosphor ($\lambda_{max}$>600 nm) instead of the single yellow-emitting phosphor. The two phosphors absorb the blue light from the InGaN chip and convert it into green and red light and then by color mixing the white light is generated with higher color rendering and larger color gamut. But in both methods the final color temperature (CCT) and color coordinate of the pc-LED strongly depends on the emission characteristics of the blue-LED chips. As a consequence, in order to get a similar CCT only a part of available blue-LED chips can be used. The third one is to use a near UV-LED chip plus blue, green, and red emitting phosphor. In comparison with the former two ways, the third one provides improved color rendering and a wide range of color temperatures as well as an independent color coordinate. The disadvantage of this technical solution is the color shift during the life cycle resulting from the different aging rate of the three different phosphors.

There are also attempts to provide phosphors that are excitable by a radiation source of the near UV and emit the visible light, especially, a single phosphor which can emit white light without the request to combine with some other phosphors. Its emission spectrum is composed of the three primary colors (blue, green, and red) and covers the whole visible range from 400 nm to 700 nm. Subsequently, some of these attempts are cited:

In the article of Park et al. in Appl. Phys. Lett. 82 (2004) pages 2931-2933; Solid state comm. 136 (2005) 504, a phosphor of the general formula: $EA_3MgSi_2O_8$:$Eu^{2+}$, $Mn^{2+}$ (EA=Sr, Ba) is presented. This phosphor shows three emission bands peaking at 422 nm, 505 nm and 620 nm. The 442 nm and 505 nm emissions originate from $Eu^{2+}$, while the 620 nm emission originates from $Mn^{2+}$ ions. The fabricated white light emitting light diode integrating 400-nm-emitted chip with $EA_3MgSi_2O_8$:$Eu^{2+}$, $Mn^{2+}$ (EA=Sr, Ba) phosphor shows warm white light and higher color rendering index and higher color stability against input power in comparison with a commercial blue-pumped YAG:$Ce^{3+}$. However, this white LED has a low luminous efficiency and a poor long-term stability.

In J. Electrochem. Soc. 155 (2008) pages J 193-J 197; Electrochem. Solid state lett. 11 [2] (2008) E1, white light emitting phosphor has been proven to be a mixture of $EA_3MgSi_2O_8$:$Eu^{2+}$, $Mn^{2+}$ (EA=Sr, Ba) and $EA_2SiO_4$:$Eu^{2+}$ (EA=Ba, Sr). In fact, the emission band peaking at 505 nm originates from $EA_2SiO_4$:$Eu^{2+}$ (EA=Ba, Sr) instead of $EA_3MgSi_2O_8$:$Eu^{2+}$, $Mn^{2+}$ (EA=Sr, Ba).

In the article by Lakshminarasimhan et al. in J. electrochem. Soc. 152 [9] (2005) H152, systems of the formula $Sr_2SiO_4$:Eu,Ce are suggested. This system exhibits a low efficiency and poor stability.

In the article by Chang et al. in Appl. Phys. Lett. 90 (2007) 161901) systems of the formula $Ca_2MgSi_2O_7$:Eu,Mn. This system also exhibits a low efficiency and poor stability.

In the article of J. Liu et al. in Adv. Mater. 17 (2005) pages 2974-2978, a single phosphor is presented that can emit the blue (445 nm), green (515 nm), and red (624 nm) light simultaneously. The CIE coordinates are located at (0.31, 0.34), which is very close to (0.33, 0.33) of the standard white emission. The host lattice is an organic compound, which is not very stable under high temperature.

WO 2006/111568 A2 shows white light emitting non-stoichiometric compounds having a not fixed composition.

Recently, in the search for new functional materials, borophosphate, which contain both the borate group and the phosphate group as basic structural units, has also drawn attention. In the last couple of years many borophosphates were synthesized and structurally characterized. As far as luminescence is concerned, most of work has been focused on studying the luminescence properties of rare earth ions in $MBPO_5$ (M=Ca, Sr, Ba), (Ba, Sr)$_3BP_3O_{12}$, and (Ba, Sr)$_6BP_5O_{20}$Ba$_3BPO_7$ host lattices.

DE 1 927 455 shows borate phosphate phosphors like $Ba_{0.995}Eu_{0.005}BPO_5$ and $Sr_{0.99}Eu_{0.01}BPO_5$ that are used in low-pressure mercury discharge lamps. These $Eu^{2+}$-activated $MBPO_5$ phosphors show a broad emission band in the UV to blue range with a maximum, dependent on the alkaline earth metals present, at 385 nm to 400 nm.

DE 29 00 989 A1 shows borate phosphate phosphors of the general formula $Ba_{3-p}Eu_pBP_3O_{12}$ for the usage in low-pressure mercury discharge lamps. These phosphors show a greenish emission with the maximum in the wavelength range of 490 nm to 520 nm.

In Appl. Phys. B 86 (2007), Pages 647-651, $Eu^{2+}$-activated $(Ba,Sr)_6BP_5O_{20}$ phosphors are shown that exhibit bluish green emission in the wavelength range of 470 nm to 510 nm.

A new kind of borophosphate, i.e. $KMBP_2O_8$ (M=Ba, Sr), was discovered by Zhao et al. [Inorg. Chem. 48 (2009) pages 6623-6629] in 2009. Until now, the luminescence properties of the rare earth ions in these host lattices have never been reported. The main structure features of this host lattice are similar to those of the other borophosphate compounds, i.e. a network of $PO_4$ tetrahedron and $BO_3$ triangles/$BO_4$ tetrahedrons.

WO 2009/036425 A1 shows a phosphor blend for a compact fluorescent lamp comprising $LaPO_4$:$Ce^{3+}$, $Tb^{3+}$; $Y_2O_3$:$Eu^{3+}$; $Sr_6BP_5O_{20}$:$Eu^{2+}$ and $Mg_4GeO_{5.5}F$:$Mn^{4+}$.

BRIEF SUMMARY OF THE INVENTION

An object of this invention is to provide improved phosphors that are excitable by a radiation source of the near UV and emit the visible light, especially, as a single phosphor which can emit white light without the request to combine with some other phosphors. A further object is to provide an appropriate light source.

These objects are achieved by an inventive phosphor according to claim 1 and by an inventive light source according to claim 13.

DETAILED DESCRIPTION

Figure 1:
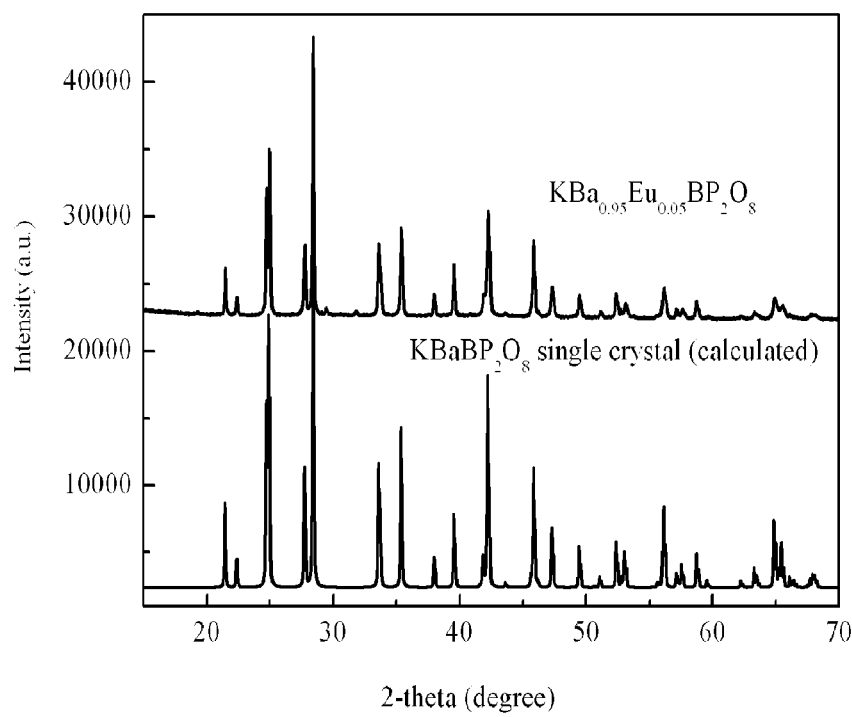
FIG. 1 shows typical powder XRD patterns of $KBa_{1-x}Eu_xBP_2O_8$ (x=0.05)

Surprisingly, single $Eu^{2+}$-activated $KMBP_2O_8$ (M=Ba, Sr, Ca) phosphors show white light with high luminous efficiency under near UV excitation. The behavior is unexpected because all other borophosphate phosphors have never shown such a luminescence property and because there is only one crystallographic site available for the activator $Eu^{2+}$. In addition, they exhibit a high thermal stability, which is comparable to that of YAG:$Ce^{3+}$ phosphor. The luminescence properties (e.g. peak center, color coordination and FWHM) of $Eu^{2+}$-doped $KMBP_2O_8$ phosphors can be adjusted by changing the $Eu^{2+}$ concentration or the ratio between Ba, Sr and Ca in $KMBP_2O_8$ host lattice. The $Eu^{2+}$ concentration can vary in a wide range. The emission band of $Eu^{2+}$-doped $KBaBP_2O_8$ phosphor can be shifted to the longer wavelength range by increasing the $Eu^{2+}$ concentration. While the emission bands of $Eu^{2+}$-doped $KBaBP_2O_8$ phosphors can be shifted to the shorter wavelength range by the replacement of $Ba^{2+}$ by $Sr^{2+}$. In addition, its luminous efficiency also can be improved dramatically by such a replacement. The same effect also can be reached by the replacement of $Ba^{2+}$ by $Ca^{2+}$. In all the $Eu^{2+}$-doped phosphors, it would expect that $Eu^{2+}$ will replace the crystallographic site of $M^{2+}$ with 8-fold oxygen coordination.

The present invention discloses new borophosphate phosphors that are activated by rare earth ions, preferably by $Eu^{2+}$ ions.

The inventive phosphor converts radiation. For this, it absorbs radiation in a first wavelength range of the electromagnetic spectrum and emits radiation in a second wavelength range of the electromagnetic spectrum. The first wavelength range of the electromagnetic spectrum differs from the second wavelength range of the electromagnetic spectrum.

The inventive borophosphate phosphor is activated with divalent rare earth metal ions. It is represented by the following general formula:

$$AM_{1-x}RE_xBP_2O_8$$

Symbol A represents at least one univalent alkaline metal ion. Symbol M stands for at least one divalent metal ion. Symbol RE is at least one divalent ion selected from the group comprising rare earth metals as well as Pb, Sn, Cu, and Mn. Anyway, RE contains at least one divalent rare earth metal ion that is acting as an activator. Variable x is limited by 0<x<1.

Preferably, RE contains at least the divalent rare earth metal ion of Eu, namely $Eu^{2+}$ that is acting as activator.

In a further preferred embodiment, RE contains at least the divalent rare earth metal ion of Sm or Yb, namely $Sm^{2+}$ or $Yb^{2+}$ that is acting as activator.

Preferably, RE further contains at least one divalent ion selected from the group comprising Ce, Yb, Tb, Gd, Dy, and Sm that is acting as a coactivator. Alternatively or supplementary, RE further contains at least one divalent ion selected from the group comprising Pb, Sn, Cu, and Mn that is acting as a coactivator.

Variable x is preferably less than or equal to 0.2; and more preferably less than or equal to 0.1.

In a preferred embodiment, symbol A represents at least one univalent alkaline metal ion selected from the group comprising Li, K, Na, Rb, and Cs; or more preferably, selected from the group comprising Li, K, and Na.

Preferably, M stands for at least one divalent metal ion selected from the group comprising Ca, Sr, Ba, Be, Mg, and Zn; or more preferably, selected from the group comprising Ca, Sr, and Ba.

In a preferred embodiment of the invention, the phosphor shows the following formula:

$$AM_{1-x}EU_xBP_2O_8$$

wherein A=Li, K, Na, Rb, and/or Cs; and wherein M=Ca, Sr, Ba, Be, Mg, and/or Zn.

In a further preferred embodiment of the inventive phosphor, symbol A stand for potassium K. Further, symbol M represents at least one divalent metal ion selected from the group comprising Ca, Sr, Ba, and Zn. RE contains at least one divalent rare earth metal ion selected from the group comprising Eu, Sm, and Yb that is acting as activator and at least one divalent ion selected from the group comprising Pb, Cu, and Mn. In this embodiment, variable x is less than or equal to 0.1.

In a further preferred embodiment of the invention, M stands for calcium, barium, strontium, or combinations of these three elements resulting in one of the following formulae:

$$ABa_{1-x}EU_xBP_2O_8;$$

$$ABa_{(1-x-y)}Sr_yEU_xBP_2O_8; \text{ and}$$

$$ABa_{(1-x-z)}Ca_zEu_xBP_2O_8;$$

wherein 0≤y≤1.0 and 0≤z≤0.3.

Preferably, A is at least one univalent alkaline metal ion selected from the group comprising Li, K, and Na. Further, M stands for Ba. RE represents Eu. Variable x is smaller or equal 0.1. The resulting general formula is:

$$ABa_{1-x}Eu_xBP_2O_8.$$

In that embodiment, A is preferably K, resulting in the general formula: $KBa_{1-x}Eu_xBP_2O_8$, wherein variable x is more preferably less than or equal to 0.08.

In another preferred embodiment of the invention, symbol A stands for at least one univalent alkaline metal ion selected from the group comprising Li, K, and Na. Further M consists of Ba and Sr. RE represents Eu. The resulting general formula is:

$$ABa_{(1-x-y)}Sr_yEu_xBP_2O_8,$$

wherein x≤0.1, 0<y<1.0 and (x+y)<1.0. In this embodiment, A is preferably K, resulting in the general formula: $KBa_{(1-x-y)}Sr_yEU_xBP_2O_8$, wherein variable x is more preferably less than or equal to 0.08 and y is more preferably less than or equal to 0.4, wherein (x+y)≤0.5.

In another preferred embodiment of the invention, symbol A stands for at least one univalent alkaline metal ion selected from the group comprising Li, K, and Na. Further M consists of Ba and Ca. RE represents Eu. The resulting general formula is:

$$ABa_{(1-x-z)}Ca_zEu_xBP_2O_8,$$

wherein $x \le 0.1$ and $0 < z \le 0.3$. In this embodiment, A is preferably K, resulting in the general formula $KBa_{(1-x-z)}Ca_zEu_xBP_2O_8$, wherein variable x is more preferably less than or equal to 0.08 and wherein $(x+z) \le 0.3$.

The inventive phosphor shows a strong excitation band in the wavelength range of 250 nm to 420 nm. From there, the first wavelength range ranges preferably from 250 nm to 420 nm; or more preferably from 300 nm to 370 nm.

The second wavelength range is preferably the whole visual spectrum, especially in the range from 400 nm to 700 nm, or at least in the range from 420 nm to 600 nm. A peak center of the second wavelength is preferably between 450 nm and 480 nm.

The inventive phosphor can be well excited under UV light irradiation and emits blue or white light. In addition, the phosphor shows high thermal stability, which is comparable to that of YAG:$Ce^{3+}$ phosphor.

Due to the described luminescence characteristics, the phosphor according to the present invention can be used as a radiation converter for the transformation of UV (250 nm to 420 nm) into a longer-wave visible light that well be emitted by the phosphor preferably in blue to orange spectral region.

The inventive phosphor can be used in light sources, e.g. in white light emitting light sources. Alternatively, this phosphor can be used in photovoltaic cells, in greenhouse foils, or in greenhouse glasses. In these applications, the light of the Sun forms the radiation in the first wavelength range of the electromagnetic spectrum. The radiation emitted by the phosphor will be directed to the photovoltaic cells and to the plants in the greenhouse, respectively.

The inventive light source comprises an inventive phosphor and a radiation emitting element that emits radiation in the first wavelength range of the electromagnetic spectrum. The phosphor converts the emitted radiation of the first wavelength range into the radiation of the second wavelength range. The radiation emitting element acts as excitation source for the phosphor. The light source emits at least the radiation in the second wavelength range of the phosphor.

In a special embodiment of the inventive light source, the light source comprises at least one further phosphor that emits red, yellow, green, and/or blue light in order to improve the performance of the light source.

The inventive light source is preferably formed by a fluorescent lamp, by a colored light emitting LED, by a white light emitting LED or by an application based on UV laser or purple laser excitation.

The radiation emitting element is preferably formed by high-pressure discharge plasma or by low-pressure discharge plasma, by a UV inorganic light emitting diode (LED) or by a purple-blue inorganic light emitting diode (LED), or by a laser or by a laser diode. The radiation emitting element can be formed by an LED. This encloses different types of inorganic LED like SMD, top-LED, and side-view LED that are having a plastic or ceramic body and incorporating a light emitting element which emits radiation in the first wavelength range, especially; in the UV-A and purple-blue.

The luminescent borophosphate phosphor according to the invention can be prepared by means of a solid state reaction at a high temperature of a mixture of oxides of the component elements or compounds which are converted into the corresponding oxides on heating. In general, it is advantageous to heat the starting mixtures in two steps. The product obtained need to be pulverized after cooling after each heating operation. The last heating operation is usually performed in a reducing atmosphere (i.e. 70% $N_2$-30% $H_2$) to obtain the europium in the desired bivalent state.

In the following the synthesis conditions are still described in more detail on the basis of a few examples. The examples describe typical conditions and materials but do not act as limitation. Persons who skilled in the art may find some different ways to get the phosphor, e.g. substitution of raw materials by other decomposable salts, for instance; carbonates by oxalates, acetates, nitrates; using other mixing methods like ball mill, vibration mill and others; deviation in temperature, atmosphere and duration of the high temperature solid state reaction, application of sol-gel-processes or spray pyrolysis and others.

Example 1

A mixture is made of 1.380 g $K_2CO_3$, 4.020 g $BaCO_3$, 0.106 g $Eu_2O_3$, 1.298 g $H_3BO_3$ and 4.601 g $NH_4H_2PO_4$. The raw materials were weighted in an agate mortar and homogenously mixed. This mixture was placed in alumina crucibles. The crucibles covered with an alumina plate were heated in a furnace in air for 4 hours at a temperature of 400° C. After cooling and pulverizing, the product was subjected to a heat operation for 8 hour at 900° C. under a flowing 70% $N_2$-30% $H_2$ atmosphere in a covered alumina crucible. After cooling and pulverizing, a luminescent materials have a composition defined by the formula $KBa_{0.97}Eu_{0.03}BP_2O_8$ was obtained. For X-ray diffraction photograph, it appeared that the crystalline powder had the crystal structure of the $KBaBP_2O_8$ phase.

Example 2

A mixture is made of 1.380 g $K_2CO_3$, 2.644 g $BaCO_3$, 0.886 g $SrCO_3$, 0.106 g $Eu_2O_3$, 1.298 g $H_3BO_3$, and 4.601 g $NH_4H_2PO_4$. This mixture was heated for 4 h in a furnace in air at a temperature of 400° C. After cooling and pulverizing, the product was subjected to a heat operation for 10 hour at 900° C. under a flowing 70% $N_2$-30% $H_2$ atmosphere in a covered alumina crucible. After cooling and pulverizing, a luminescent materials have a composition defined by the formula $KBa_{0.67}Sr_{0.30}Eu_{0.03}BP_2O_8$ was obtained. For X-ray diffraction photograph, it appeared that the crystalline powder had the crystal structure of the $KBaBP_2O_8$ phase. The luminescence intensity of the sample is about 135% relative to that of the sample in Example 1 under excitation of 340 nm.

Example 3

A mixture is made of 1.380 g $K_2CO_3$, 3.236 g $BaCO_3$, 0.300 g $CaCO_3$, 0.106 g $Eu_2O_3$, 1.298 g $H_3BO_3$, and 4.601 g $NH_4H_2PO_4$. This mixture was heated for 6 h in a furnace in air at a temperature of 400° C. After cooling and pulverizing, the product was subjected to a heat operation for 12 hour at 900° C. under flowing 70% $N_2$-30% $H_2$ atmosphere in a covered alumina crucible. After cooling and pulverizing, a luminescent materials have a composition defined by the formula $KBa_{0.82}Ca_{0.15}Eu_{0.03}BP_2O_8$ was obtained. For X-ray diffraction photograph, it appeared that the crystalline powder had the crystal structure of the $KBaBP_2O_8$ phase. The luminescence intensity of this sample is about 126% relative to that of the sample in Example 1 under excitation of 340 nm.

Example 4

A mixture is made of 1.106 g $K_2CO_3$, 0.202 g $Na_2CO_3$, 3.828 g $BaCO_3$, 0.106 g $Eu_2O_3$, 1.298 g $H_3BO_3$, and 4.601 g $NH_4H_2PO_4$. This mixture was heated for 4 h in a furnace in air at a temperature of 400° C. After cooling and pulverizing, the product was subjected to a heat operation for 9 hour at 900° C. under a flowing 70% $N_2$-30% $H_2$ atmosphere in a covered alumina crucible. After cooling and pulverizing, a luminescent materials have a composition defined by the formula $K_{0.8}Na_{0.2}Ba_{0.97}Eu_{0.03}BP_2O_8$ was obtained. The luminescence intensity of the sample is about 120% relative to that of the sample in Example 1 under excitation of 340 nm.

Example 5

A mixture is made of 1.106 g $K_2CO_3$, 0.148 g $Li_2CO_3$, 3.828 g $BaCO_3$, 0.106 g $Eu_2O_3$, 1.298 g $H_3BO_3$, and 4.601 g $NH_4H_2PO_4$. This mixture was heated for 4 h in a furnace in air at a temperature of 400° C. After cooling and pulverizing, the product was subjected to a heat operation for 9 hour at 900° C. under a flowing 70% $N_2$-30% $H_2$ atmosphere in a covered alumina crucible. After cooling and pulverizing, a luminescent materials have a composition defined by the formula $K_{0.8}Li_{0.2}Ba_{0.97}Eu_{0.03}BP_2O_8$ was obtained. The luminescence intensity of the sample is about 80% relative to that of the sample in Example 1 under excitation of 340 nm.

Example 6

A mixture is made of 1.382 g $K_2CO_3$, 0.163 g ZnO, 3.434 g $BaCO_3$, 0.106 g $Eu_2O_3$, 1.298 g $H_3BO_3$, and 4.601 g $NH_4H_2PO_4$. This mixture was heated for 4 h in a furnace in air at a temperature of 400° C. After cooling and pulverizing, the product was subjected to a heat operation for 9 hour at 900° C. under a flowing 70% $N_2$-30% $H_2$ atmosphere in a covered alumina crucible. After cooling and pulverizing, a luminescent materials have a composition defined by the formula $KBa_{0.87}Zn_{0.1}Eu_{0.03}BP_2O_8$ was obtained. The luminescence intensity of the sample is about 105% relative to that of the sample in Example 1 under excitation of 340 nm.

Example 7

A mixture is made of 1.382 g $K_2CO_3$, 0.070 g $Sm_2O_3$, 3.710 g $BaCO_3$, 0.140 g $Eu_2O_3$, 1.298 g $H_3BO_3$, and 4.601 g $NH_4H_2PO_4$. This mixture was heated for 4 h in a furnace in air at a temperature of 400° C. After cooling and pulverizing, the product was subjected to a heat operation for 9 hour at 900° C. under a flowing 70% $N_2$-30% $H_2$ atmosphere in a covered alumina crucible. After cooling and pulverizing, a luminescent materials have a composition defined by the formula $K_{0.8}Li_{0.2}Ba_{0.97}Eu_{0.03}BP_2O_8$ was obtained. The luminescence intensity of the sample is about 98% relative to that of the sample in Example 1 under excitation of 340 nm.

Example 8

A mixture is made of 1.382 g $K_2CO_3$, 0.078 g $Yb_2O_3$, 3.710 g $BaCO_3$, 0.140 g $Eu_2O_3$, 1.298 g $H_3BO_3$, and 4.601 g $NH_4H_2PO_4$. This mixture was heated for 4 h in a furnace in air at a temperature of 400° C. After cooling and pulverizing, the product was subjected to a heat operation for 9 hour at 900° C. under a flowing 70% $N_2$-30% $H_2$ atmosphere in a covered alumina crucible. After cooling and pulverizing, a luminescent materials have a composition defined by the formula $KBa_{0.94}Eu_{0.04}Yb_{0.02}BP_2O_8$ was obtained. The luminescence intensity of the sample is about 85% relative to that of the sample in Example 1 under excitation of 340 nm.

In the following table, luminescence properties of $Eu^{2+}$-doped $KBaBP_2O_8$ phosphors with different $Eu^{2+}$ doping concentrations are listed:

| Samples | $KBa_{1-x}Eu_xBP_2O_8$ | Peak center (nm) | Color coordination x | Color coordination y | FWHM (nm) | Relative intensity (%) |
|---|---|---|---|---|---|---|
| BP 0009 | x = 0.005 | 454.5 | 0.2342 | 0.2877 | 146 | 71 |
| BP 0010 | x = 0.01 | 461.6 | 0.2312 | 0.2919 | 145 | 94 |
| BP 0011 | x = 0.02 | 464.5 | 0.2323 | 0.2999 | 144 | 98 |
| BP 0012 | x = 0.03 | 468.2 | 0.2275 | 0.2914 | 139 | 100 |
| BP 0013 | x = 0.05 | 468.8 | 0.2410 | 0.3105 | 147 | 94 |
| BP 0014 | x = 0.08 | 468.0 | 0.2419 | 0.3317 | 147 | 87 |
| BP 0015 | x = 0.10 | 474.6 | 0.2407 | 0.3174 | 148 | 60 |

In the following table, luminescence properties of $Eu^{2+}$-doped $KBa_{1-y}Sr_yBP_2O_8$ ($0 \leq y \leq 1.0$) phosphors with different Sr contents are listed:

| Samples | $KBa_{0.97-y}Sr_yEu_{0.03}BP_2O_8$ | Peak center (nm) | Color coordination x | Color coordination y | FWHM (nm) | Relative intensity (%) |
|---|---|---|---|---|---|---|
| BP 0012 | y = 0 | 468.2 | 0.2275 | 0.2914 | 139 | 100 |
| BP 0027 | y = 0.05 | 466.3 | 0.2238 | 0.2861 | 132 | 107 |
| BP 0028 | y = 0.10 | 462.5 | 0.2152 | 0.2699 | 122 | 119 |
| BP 0029 | y = 0.15 | 458.3 | 0.2081 | 0.2556 | 114 | 127 |
| BP 0030 | y = 0.20 | 458.4 | 0.2054 | 0.2488 | 110 | 130 |
| BP 0031 | y = 0.25 | 457.7 | 0.2020 | 0.2421 | 106 | 132 |
| BP 0032 | y = 0.30 | 458.1 | 0.1988 | 0.2353 | 102 | 135 |
| BP 0033 | y = 0.50 | 456.3 | 0.1904 | 0.2181 | 93 | 130 |
| BP 0047 | y = 0.97 | 454.5 | 0.1906 | 0.2067 | 91 | 73 |

In the following table, luminescence properties of $Eu^{2+}$-doped $KBa_{1-z}Ca_zBP_2O_8$ ($0 \leq z \leq 0.30$) phosphors with different Ca contents are listed:

| Samples | $KBa_{0.97-z}Ca_zEu_{0.03}BP_2O_8$ | Peak center (nm) | Color coordination x | Color coordination y | FWHM (nm) | Relative intensity (%) |
|---|---|---|---|---|---|---|
| BP 0012 | z = 0 | 468.2 | 0.2275 | 0.2914 | 139 | 79 |
| BP 0020 | z = 0.03 | 463.3 | 0.2230 | 0.2848 | 131 | 100 |
| BP 0021 | z = 0.05 | 461.5 | 0.2178 | 0.2736 | 124 | 106 |
| BP 0022 | z = 0.10 | 458.9 | 0.2049 | 0.2450 | 108 | 119 |
| BP 0023 | z = 0.15 | 453.9 | 0.1972 | 0.2270 | 99 | 127 |
| BP 0025 | z = 0.30 | 450 | 0.1957 | 0.2193 | 95 | 101 |

The foregoing and other features and advantages of the present invention will become more readily appreciated as the same become better understood by reference to the following accompanying drawings, wherein:

FIG. 1 shows typical powder XRD patterns of $KBa_{1-x}Eu_xBP_2O_8$ (x=0.05), namely $KBa_{0.95}Eu_{0.05}BP_2O_8$ in comparison to $KBaBP_2O_8$.

Figure 2:
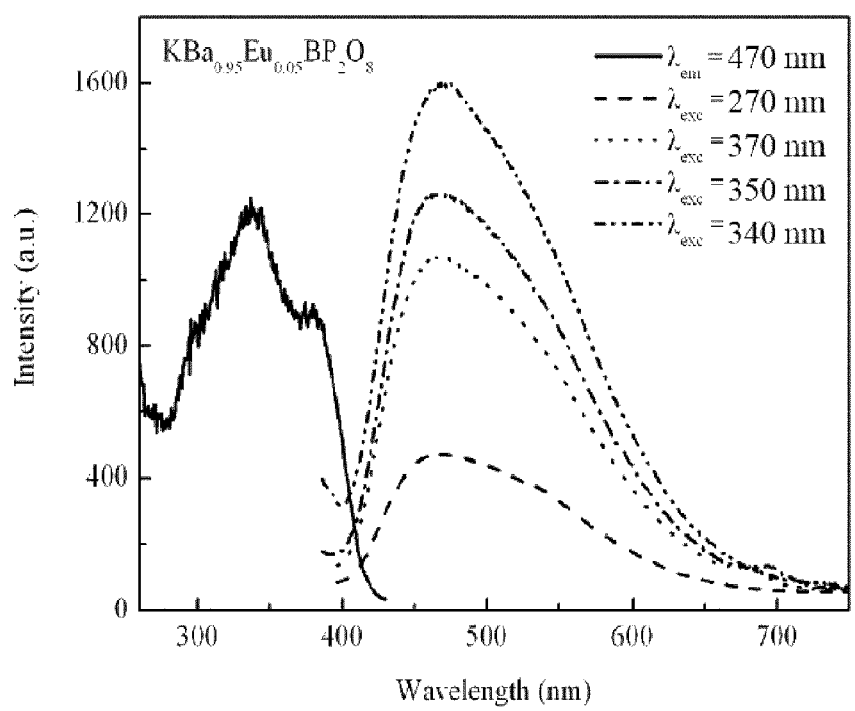
FIG. 2 shows typical excitation and emission spectra of $KBa_{1-x}Eu_xBP_2O_8$ (x=0.05)

FIG. 2 shows typical excitation and emission spectra of $KBa_{1-x}Eu_xBP_2O_8$ (x=0.05), namely $KBa_{0.95}Eu_{0.05}BP_2O_8$.

Figure 3:
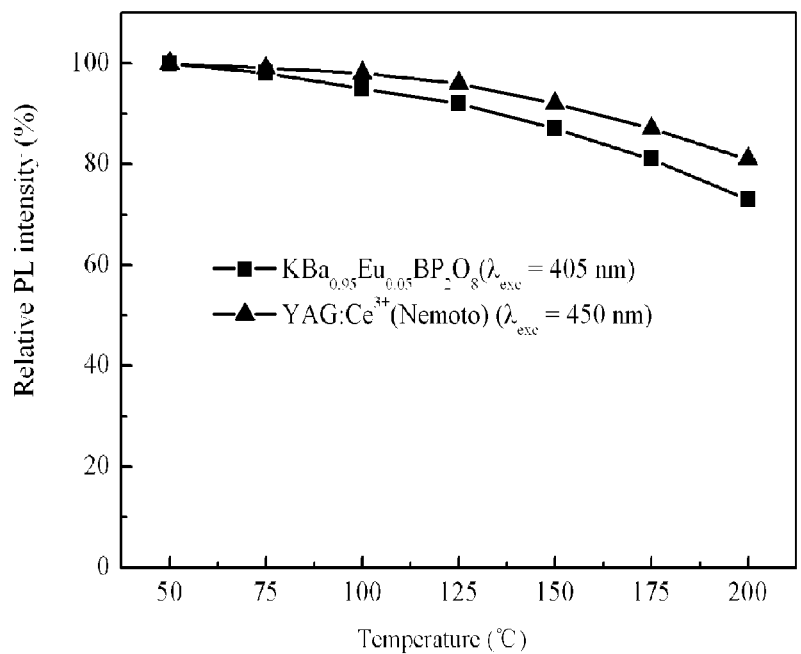
FIG. 3 shows temperature dependent luminescence of $Eu^{2+}$-doped $KBaBP_2O_8$.

FIG. 3 shows temperature dependence of the luminescence of $Eu^{2+}$-doped $KBaBP_2O_8$ phosphor under excitation of 405 nm in comparison to $YAG:Ce^{3+}$.

Figure 4:
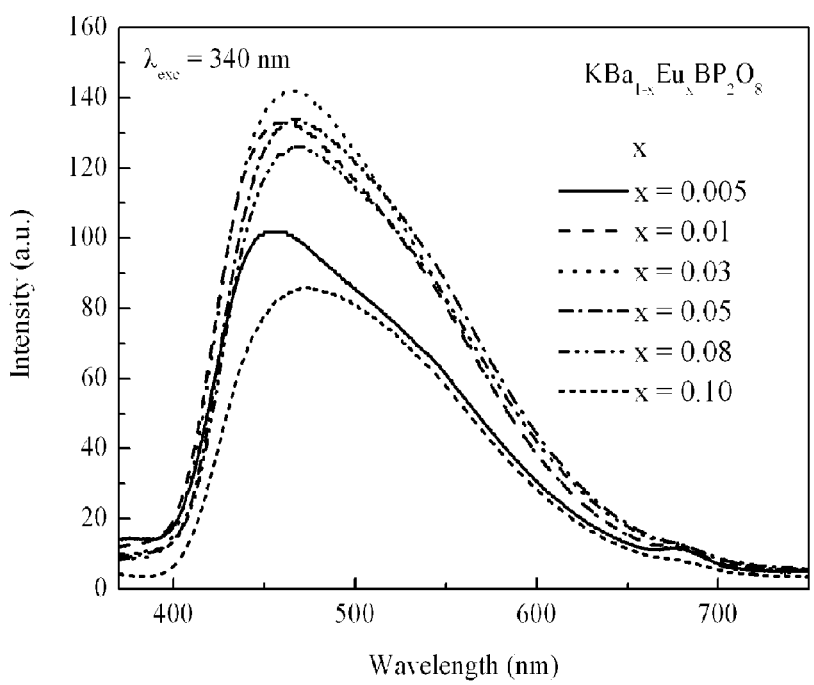
FIG. 4 shows emission spectra of $KBa_{1-x}Eu_xBP_2O_8$ phosphor with different $Eu^{2+}$ doping concentrations.

FIG. 4 shows emission spectra of $KBa_{1-x}Eu_xBP_2O_8$ phosphor with different $Eu^{2+}$ doping concentrations ranging from x=0.005 to x=0.10.

Figure 5:
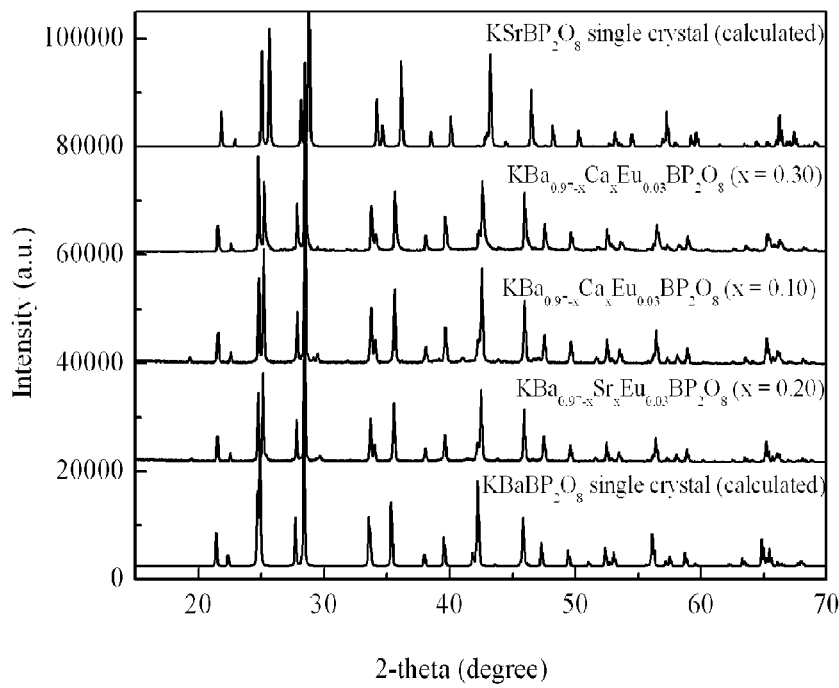
FIG. 5 shows typical XRD patterns of $Eu^{2+}$-doped K(Ba, Sr)$BP_2O_8$ and K(Ba,Ca)$BP_2O_8$ phosphors.

FIG. 5 shows typical XRD patterns of $KBa_{0.67}Ca_{0.3}Eu_{0.03}BP_2O_8$, $KBa_{0.87}Ca_{0.1}Eu_{0.03}BP_2O_8$, and $KBa_{0.77}Sr_{0.2}Eu_{0.03}BP_2O_8$ in comparison to $KBaBP_2O_8$ and $KSrBP_2O_8$.

Figure 6:
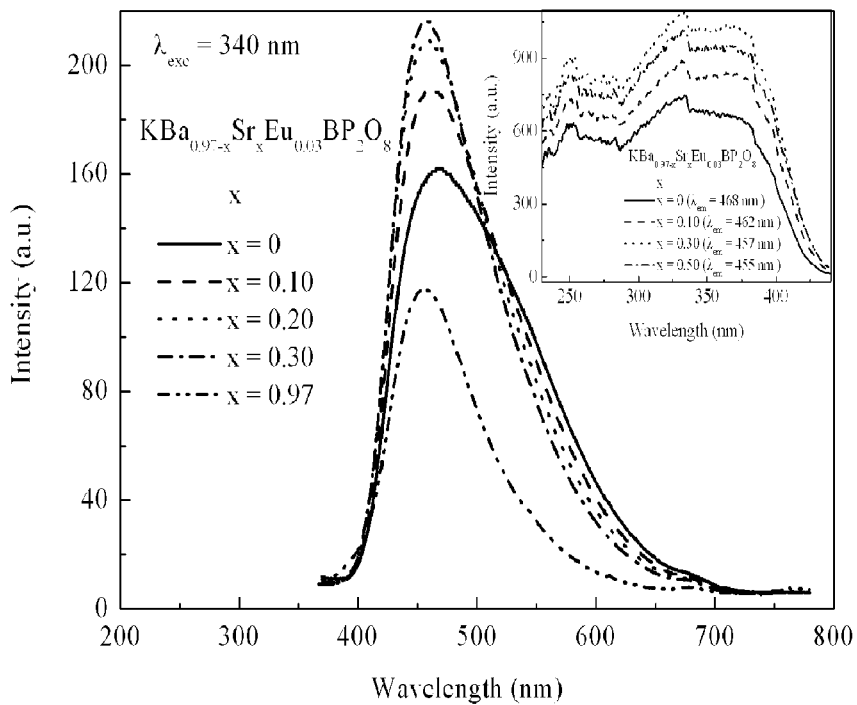
FIG. 6 shows excitation (inset) and emission spectra of $Eu^{2+}$-doped K(Ba,Sr)$Eu_{0.03}BP_2O_8$ with different Sr and Ba contents.

FIG. 6 shows excitation (inset) and emission spectra of $KBa_{0.97}Eu_{0.03}BP_2O_8$, $KBa_{0.87}Sr_{0.1}Eu_{0.03}BP_2O_8$, $KBa_{0.77}Sr_{0.2}Eu_{0.03}BP_2O_8$, $KBa_{0.67}Sr_{0.3}Eu_{0.03}BP_2O_8$, and $KSr_{0.97}Eu_{0.03}BP_2O_8$.

Figure 7:
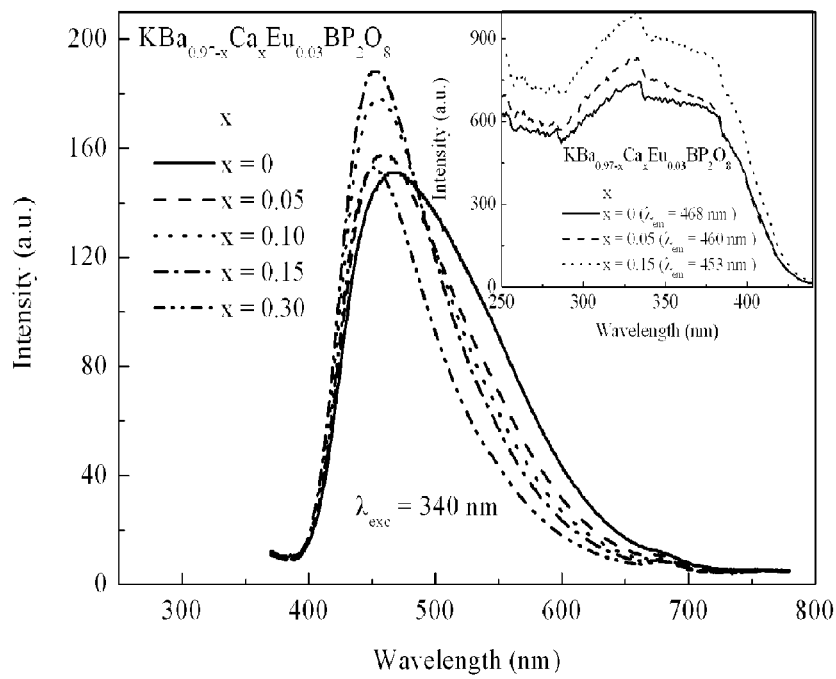
FIG. 7 shows excitation (inset) and emission spectra of $Eu^{2+}$-doped K(Ba,Ca)$Eu_{0.03}BP_2O_8$ with different Ca and Ba contents.

FIG. 7 shows excitation (inset) and emission spectra of $KBa_{0.97}Eu_{0.03}BP_2O_8$, $KBa_{0.92}Ca_{0.05}Eu_{0.03}BP_2O_8$, $KBa_{0.87}Ca_{0.1}Eu_{0.03}BP_2O_8$, $KBa_{0.82}Ca_{0.15}Eu_{0.03}BP_2O_8$, and $KBa_{0.67}Ca_{0.3}Eu_{0.03}BP_2O_8$.

Figure 8:
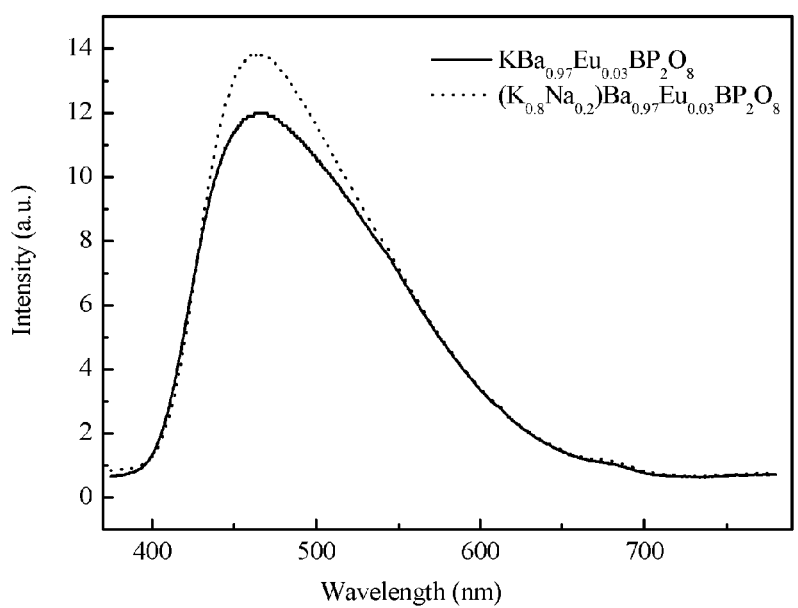
FIG. 8 shows emission spectra of $Eu^{2+}$-doped $KBaBP_2O_8$ partly substituted by Na.

FIG. 8 shows emission spectra of $Eu^{2+}$-doped $KBaBP_2O_8$ and in the case when K is partly substituted by Na.

Figure 9:
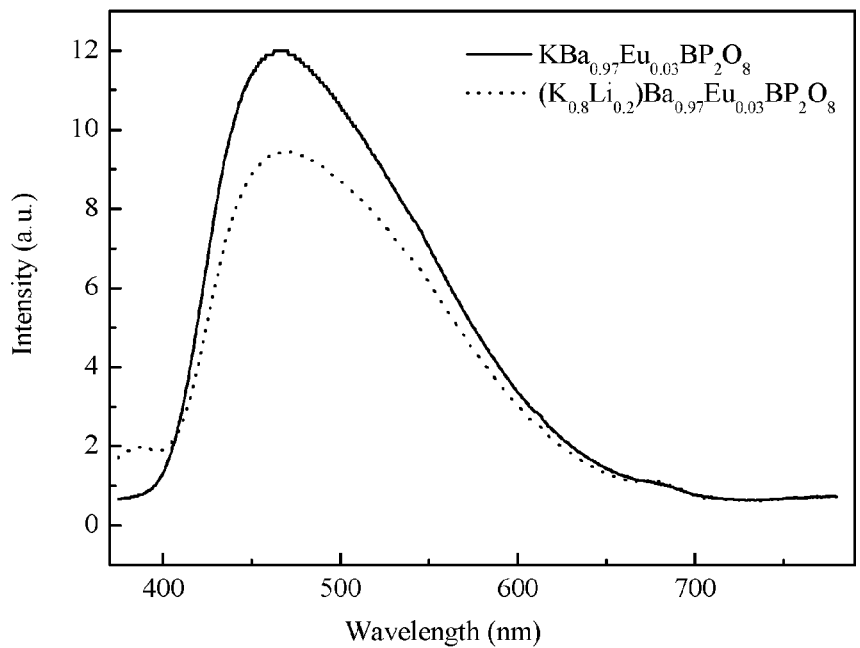
FIG. 9 shows emission spectra of $Eu^{2+}$-doped $KBaBP_2O_8$ partly substituted by Li.

FIG. 9 shows emission spectra of $Eu^{2+}$-doped $KBaBP_2O_8$ and in the case when K is partly substituted by Li.

Figure 10:
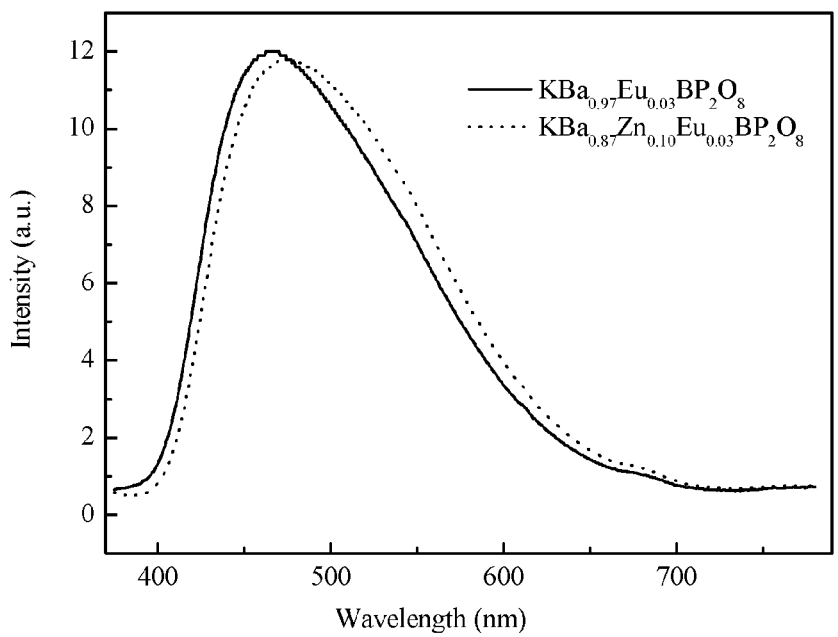
FIG. 10 shows emission spectra of $Eu^{2+}$-doped $KBaBP_2O_8$ partly substituted by Zn.

FIG. 10 shows emission spectra of $Eu^{2+}$-doped $KBaBP_2O_8$ and in the case when Ba is partly substituted by Zn.

The invention claimed is:

1. A phosphor that absorbs radiation in a first wavelength range of the electromagnetic spectrum and emits radiation in a second wavelength range of the electromagnetic spectrum, wherein the phosphor is a borophosphate activated with divalent rare earth metal ions and represented by the following general formula:

$$AM_{1-x}R_xBP_2O_8;$$

wherein:
A is at least one univalent alkaline metal ion selected from the group comprising Li, K, Na, Rb, and Cs;
M is at least one divalent metal ion selected from the group comprising Ca, Sr, Ba, Be, Mg, and Zn;
RE is at least one divalent ion selected from the group comprising rare earth metals Eu, Sm, and Yb as well as Pb, Sn, Cu, and Mn, wherein at least one of the divalent rare earth metal ions Eu, Sm, and/or Yb is acting as an activator; and $0 < x \leq 0.2$.

2. The phosphor of claim 1, wherein RE contains at least the divalent rare earth metal ion of Eu that is acting as activator.

3. The phosphor of claim 1, wherein RE further contains at least one divalent ion selected from the group comprising Yb and/or Sm that is acting as a coactivator.

4. The phosphor of claim 1, wherein A is K; wherein M is at least one divalent metal ion selected from the group comprising Ca, Sr, Ba, and Zn; wherein RE contains at least one divalent rare earth metal ion selected from the group comprising Eu, Sin and Yb that is acting as activator and at least one divalent ion selected from the group comprising Pb, Cu, and Mn; and wherein $x \leq 0.1$.

5. The phosphor of claim 2, wherein A is at least one univalent alkaline metal ion selected from the group comprising Li, K, and Na; wherein M is Ba; wherein RE is Eu; and wherein $x \leq 0.1$, resulting in the general formula:

$$ABa_{1-x}Eu_xBP_2O_8.$$

6. The phosphor of claim 5, wherein A is K, resulting in the general formula:

$$KBa_{1-x}Eu_xBP_2O_8.$$

7. The phosphor of claim 2, wherein A is at least one univalent alkaline metal ion selected from the group comprising Li, K, and Na; wherein M consists of Ba and Sr; wherein RE is Eu; and wherein $x \leq 0.1$, $0 < y < 1.0$ and $(x+y) < 1.0$, resulting in the general formula:

$$ABa_{(1-x-y)}Sr_yEu_xBP_2O_8.$$

8. The phosphor of claim 7, wherein A is K, resulting in the general formula:

$$KBa_{(1-x-y)}Sr_yEu_xBP_2O_8.$$

9. The phosphor of claim 2, wherein A is at least one univalent alkaline metal ion selected from the group comprising Li, K, and Na; wherein M consists of Ba and Ca; wherein RE is Eu; and wherein $x \leq 0.1$ and $0 < z \leq 0.3$; resulting in the general formula:

$$ABa_{(1-x-z)}Ca_zEu_xBP_2O_8.$$

10. The phosphor of claim 9, wherein A is K, resulting in the general formula:

$$KBa_{(1-x-z)}Ca_zEu_xBP_2O_8.$$

11. The phosphor of claim 1, wherein the first wavelength range ranges from 250 nm to 420 nm.

12. The phosphor of claim 1, wherein the second wavelength range is the whole visual spectrum.

13. A light source comprising a phosphor according to claim 1 and a radiation emitting element that emits radiation in the first wavelength range of the electromagnetic spectrum.

\* \* \* \* \*